United States Patent Office 2,868,570
Patented Jan. 13, 1959

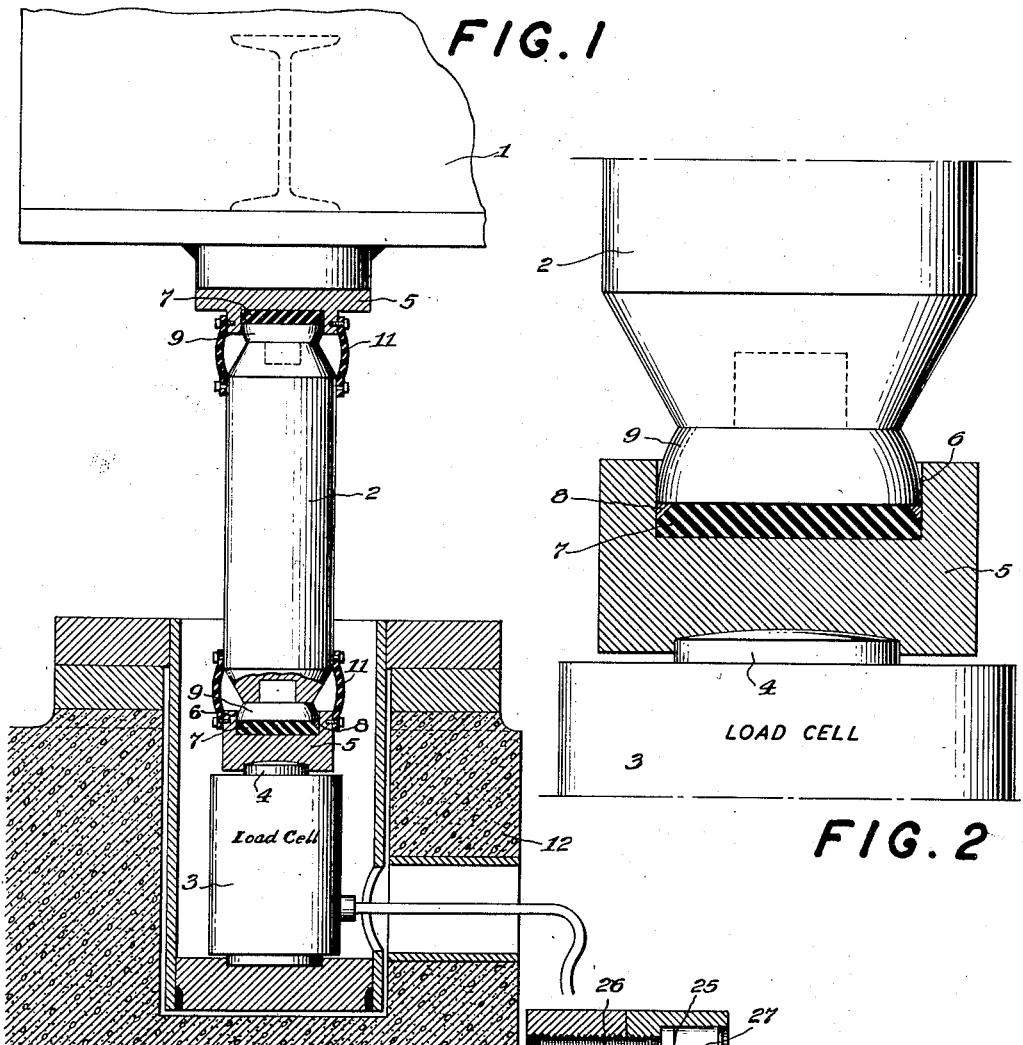

2,868,570

LOW-FRICTION LOAD-TRANSMITTING FLEXIBLE JOINT

Frank F. Hines and John F. McGrath, Jr., Arlington, Mass., assignors to Baldwin-Lima-Hamilton Corporation, a corporation of Pennsylvania Application December 30, 1955, Serial No. 556,721

6 Claims. (Cl. 287—85)

This invention relates generally to low-friction flexible load-transmitting joints that are particularly adapted for transmitting loads from weigh bridges to load-weighing cells of a type requiring such joints.

Various types of so-called low-friction load-transmitting apparatus, such as sliding plates, swivel joints, etc., have been proposed and used but they are deficient in many respects either functionally or structurally, especially when used in conjunction with precision load weighing devices which, while primarily responsive to axial loads, are somewhat sensitive to both side loads and moments resulting from the use of existing devices. My invention reduces both side forces and moments to a negligible amount for even the most precise weighing applications.

One type of such weighing device employs electrical means such as bonded wire gages for sensing deformation of a relatively rigid strain sensitive column in response to an axial load applied thereto. With these weighing devices, it is necessary to transmit forces axially to the load sensitive column with minimum side force and moment. This problem becomes particularly acute in weighing loads transmitted from a weigh bridge of a track or platform scale, or other types of scales, down to the load cells for it is necessary in these instances that normal movements and thermal expansions of the weigh bridge in a horizontal direction will not interfere with the accuracy of transmission of vertical loads to the cells. This requires that such a load-transmitting device must allow for considerable motion and yet be essentially frictionless and that it must not shunt part of the load around the load cell or be made in such a manner so as to introduce large side loads or moments into the load cell.

It is accordingly an object of my invention to provide an improved low-friction load-transmitting device that may be used effectively for transmitting axial loads in both a highly frictionless manner and with a minimum axial motion within the device itself.

A further object is to provide such an improved form of swivel joint that is relatively simple in construction, operation, and maintenance while at the same time allowing transmission of axial forces with appreciable simultaneous angular misaligning motion substantially free of friction, whereby in apparatus such as weigh bridges normal loading movements of the weigh bridge or thermal expansion thereof may occur without impairing the weighing accuracy.

In accomplishing the foregoing and other objects, I provide a support employing rubber which I cause to act under hydrostatic pressure to support the load, such hydrostatic pressure being in distinction to prior rubber supports in which the rubber is in a freely deformable state under either shear, tension or compression.

Other objects and advantages will be more apparent to those skilled in the art from the following description of the accompanying drawings in which:

Fig. 1 is a vertical view, partially in section, of an embodiment of my invention interposed between a load cell and a fragmentary portion of a weigh bridge;

Fig. 2 is an enlarged section of a form of my invention to show details of construction; and Fig. 3 is a partial sectional view showing my invention as applied to a swivel joint in the nature of a push-pull joint and combining therewith means for preloading or adjusting the volume of the flexible means of the joint.

We have shown in Fig. 1 a portion of a weigh bridge 1 supported on the upper end of a relatively long strut 2 whose lower end is supported upon any suitable type of load cell 3 which, for purposes of illustration, can be considered to be of the electrical type having a strain responsive electrical impedance element connected to a column which deforms in proportion to load applied. One type of such load cell, specifically of the bonded wire type, is shown in Ruge Patent No. 2,472,047. Mounted upon a load-receiving button 4 of the load cell is a cup-like member 5 having a cavity 6 provided with a bottom, preferably flat, and a perimeter wall, preferably cylindrical, and in which cavity a complementary rubber pad 7 is disposed. The upper outer edge of the pad is beveled and a sealing member 8 extending around the perimeter of the bevel edge of the pad and preferably triangular in cross section, fills in the space at the upper corner of the rubber pad to perform the function of obtaining hydrostatic action where a large clearance is used for economy of manufacture or alignment purposes to be discussed later. Seated upon the pad and member 8 is a foot 9, conforming to the cavity in member 5, whose outer surface may be relieved, if desired, to allow freedom of angular movement of member 9 in any direction within the cavity, one specific form of relief being a spherical surface. The lower end of the member 9 has a close but free clearance fit with the vertical wall of the cavity 6 so as to allow free vertical and angular movement within the recess but at the same time extend sufficiently over the sealing ring 8 to support the same. The cavity is thus entirely closed by the opposed surfaces, broadly constituting walls, of load transmitting members 9 and 5 and by the preferably circular wall of the cavity, while the circular wall and foot 9 have adjacent portions with clearance between the same. The upper end of the stud 2 is provided with a similar joint and the two joints are enclosed by flexible covers 11. The load cell 3 is supported in any suitable manner in a base 12.

The load-transmitting rubber pad entirely fills the cavity at the ends of the stud while the sealing rings 8 are preferably of plastic material such as "Teflon," or "nylon," which very effectively perform the function of allowing any desired clearance to be used between the foot 9 and wall 6 and still prevent the rubber from flowing or extruding out through such clearance although it will be understood that by making such clearance sufficiently small the sealing can be dispensed with. By this arrangement I am able to utilize the quality of rubber that, when confined and subjected to load, is extremely incompressible and yet carries the load as though it were supported by true hydrostatic pressure. Thus, the ends of the stud allow rocking thereof as the bridge moves relative to the load cell in a horizontal direction. The rubber pads, while being almost conmpletely incompressible against a compression load acting on the stud, are quite free to deform just as a confined fluid would do. Therefore, when the stud takes on an angle the rubber merely deforms to accommodate it and provides practically no resistance to the angling.

It is thus seen that a flexible joint has been provided which, in effect, can carry an arbitrarily large thrust load and can accommodate itself to angular movements with very little resistance. It is particularly applicable in large weigh bridges where the thermal expansion may be large and where longitudinal movements and forces on the bridge may be exceedingly large due to railway rolling stock moving onto a track scale or heavily loaded automotive trucks moving onto platform scales.

The same principles of construction are employed in Fig. 3 in a joint for transmitting forces in either axial direction and which must have a certain amount of freedom to align itself somewhat in the nature of a spherical joint. In this case the joint has a member 14 with a threaded end 15 for suitable connection to any load source and an annulus 16 whose sides 17 preferably terminate in bevels to meet a short straight peripheral section 18. This annulus is disposed within a suitable recess or cavity formed within a hub 19 and a ring 20. Annular rubber rings 21 and 22 are placed in the recesses and their outer lower corners are beveled to receive annular sealing rings 23 and 24 while annular sealing rings 25 and 26 are interposed between the rubber rings and the beveled edges of the annulus 16 to close the relatively large clearance spaces which, as in Fig. 2, can be made sufficiently small so as to dispense with the sealing rings. The ring 20 is held to the member 19 by a series of screws 27 while the rubber rings are preloaded to any desired degree by one or more radially extending preloading screw type pistons 28.

From the foregoing disclosure of Fig. 3 it is seen that the sealing rings 23 and 24 by contacting the periphery of member 14 and the walls of the recess prevent the rubber from being extruded through the clearance space around member 14 and similarly the sealing rings 25 and 26 perform a corresponding function at the other side of the rubber rings. The flange 18 of the annulus 16 is preferably very slightly smaller in diameter than the recess containing the rubber rings thereby providing clearance between adjacent portions of the walls, to insure freedom of swiveling action of the members 14 and 19 relative to each other. The preloading screws 28 are threaded pistons which assure that the rubber will completely fill the recess in that the screws preload the rubber by adjustably varying the volume of the cavity and the rubber conforms to fit. Beside the preloading function the threaded pistons 28 may also be used for adjusting the axial position of members 14 and 19 relative to each other, in which case one piston is driven into the cavity while the other is retracted correspondingly. The rubber is thus constrained so that it carries load by hydrostatic pressure and the sealing elements prevent the rubber from extruding under influence of such pressure. The end of member 19 can also be provided with a threaded portion 29 for connection to any suitable load transmitting strut. In this modification the recesses and annulus 16 have radial and cylindrical wall surfaces broadly corresponding to those of Figs. 1 and 2.

Thus it is seen that we have provided apparatus in the several modifications capable of carrying substantial axial load while still being free to swivel in substantially unrestrained manner, the axial forces being carried by rubber or rubber-like material acting in hydrostatic pressure under action of the load, while means are provided to prevent the rubber from extruding out of its cavity as a result of the pressure. It is to be understood that the term "rubber" as used herein includes any synthetic product resembling natural rubber in its properties; e. g., silicone rubber, buna rubber, "neoprene," etc., in addition to natural rubber. Such swivel action is permitted by reason of the rubber tending to deform or change shape freely while subjected to hydrostatic pressure.

The sealing members may be "Teflon," "nylon," or metal if desired. However, "Teflon" is preferred because it is a plastic having a very low coefficient of friction and, therefore, offering negligible restraint along its guiding walls and surfaces when swiveling action takes place.

It will, of course, be understood that various changes in details of construction and arrangement of parts may be made by those skilled in the art without departing from the spirit of the invention as set forth in the appended claims.

We claim:

1. A hydrostatically swiveled load-transmitting joint extending in an axial direction comprising, in combination, axially spaced and axially relatively movable load receiving and base members, having means which allow said members to have angular misaligning movement relative to the axial direction, means for providing between the members a completely closed cavity that is contractible in an axially extending direction, and a load-transmitting rubber-like element disposed within and completely filling said cavity and confined therein under the action of axial load, so that the axial component of an applied load is entirely transmitted through said rubber-like element which thereby acts in hydrostatic pressure and thereby resists said contractibility, whereby the hydrostatically loaded rubber-like element allows substantially free angular misaligning movement to occur between said load receiving and base members independently of the magnitude of the applied load and at the same time provides an axially rigid load transmitting joint.

2. The combination set forth in claim 1 further characterized in that adjustable means are provided for varying the volume of the cavity.

3. The combination set forth in claim 1 further characterized in that the rubber element is a substantially flat disk and a corner thereof adjacent to the load receiving member is chamfered, and a sealing ring is provided within the chamfered space to prevent extrusion of the rubber element out of the cavity past the end of the load receiving member.

4. A hydrostatically swiveled load-transmitting joint extending in an axial direction comprising, in combination, axially spaced and axially relatively movable load receiving and base members, means for providing between the same a cavity with walls which have adjacent portions with clearance therebetween to allow said members to have angular misaligning movement relative to the axial direction, said cavity being contractible in an axially extending direction, a load transmitting rubber-like element disposed within and completely filling said cavity, means for completely closing said cavity by closing said clearance and thereby preventing the rubber-like element from being extruded out of said cavity through such clearance, whereby the rubber-like element is confined therein under the action of axial load so that the axial component of an applied load is entirely transmitted through said rubber-like element which thereby acts in hydrostatic pressure and thereby resists said contractibility, whereby the hydrostatically loaded rubber-like element allows substantially free angular misaligning movement to occur between said load receiving and base members independently of the magnitude of the applied load and at the same time provides an axially rigid load-transmitting joint.

5. The combination set forth in claim 4 further characterized in that the means for preventing extrusion of the rubber includes a sealing element interposed between and extending around the perimeter of said adjacent wall portions in contact therewith to close said clearance space, thereby to maintain the rubber in its hydrostatic pressure state at all times when load is applied.

6. The combination set forth in claim 10 further characterized in that the cavity is a cylinder and one of said members comprises an annulus interposed between the ends of said cylindrical cavity to form two non-communicating completely closed chambers that are alternatively contractible in an axially extending direction, annular load transmitting rubber-like elements disposed respectively within said chambers and completely filling the same and confined therein under the action of axial load so that the axial component of an applied load is entirely transmitted through one or the other of the rubber-like elements which thereby act in hydrostatic pressure to resist said contractibility but allow substantially free angular misaligning movement to occur between said cylinder and annulus independently of the magnitude of the applied load and at the same time provide an axially rigid load-transmitting joint.

References Cited in the file of this patent

UNITED STATES PATENTS

| | | |
|---|---|---|
| 1,044,787 | Klingloff | Nov. 19, 1912 |
| 1,432,095 | Bartholomew | Oct. 17, 1922 |
| 1,703,592 | Paton | Feb. 26, 1929 |
| 1,952,115 | Borst | Mar. 27, 1934 |
| 1,994,388 | Erichsen | Mar. 12, 1935 |
| 2,471,672 | Booth | May 31, 1949 |
| 2,652,241 | Williams | Sept. 15, 1953 |
| 2,717,792 | Pelley | Sept. 13, 1955 |

FOREIGN PATENTS

| | | |
|---|---|---|
| 287,269 | Switzerland | Mar. 16, 1953 |